(12) United States Patent
Rossi et al.

(10) Patent No.: US 12,221,959 B2
(45) Date of Patent: Feb. 11, 2025

(54) BUSHING ASSEMBLY AND POSITIVE DISPLACEMENT ROTARY PUMP COMPRISING SAID BUSHING ASSEMBLY

(71) Applicant: Settima Meccanica S.r.l., Milan (IT)

(72) Inventors: Manuele Rossi, Ponte Dell'Olio (IT); Nicola Picciotti, Cortemaggiore (IT); Andrea Ceruti, Rivergaro (IT)

(73) Assignee: Settima Meccanica S.r.l., Milan (IT)

( * ) Notice: Subject to any disclaimer, the term of this patent is extended or adjusted under 35 U.S.C. 154(b) by 325 days.

(21) Appl. No.: 17/784,521

(22) PCT Filed: Dec. 11, 2020

(86) PCT No.: PCT/EP2020/085712
§ 371 (c)(1),
(2) Date: Jun. 10, 2022

(87) PCT Pub. No.: WO2021/116378
PCT Pub. Date: Jun. 17, 2021

(65) Prior Publication Data
US 2023/0014002 A1    Jan. 19, 2023

(30) Foreign Application Priority Data
Dec. 12, 2019   (IT) .................. 102019000023832

(51) Int. Cl.
F04C 2/08      (2006.01)
F04C 2/18      (2006.01)
F04C 15/00     (2006.01)

(52) U.S. Cl.
CPC .......... F04C 15/0057 (2013.01); F04C 2/084 (2013.01); F04C 2/18 (2013.01);
(Continued)

(58) Field of Classification Search
CPC .. F04C 2/084; F04C 2/102; F04C 2/18; F04C 15/0026; F04C 15/0057; F04C 15/0042;
(Continued)

(56) References Cited

U.S. PATENT DOCUMENTS 4,087,216 A    5/1978   Shumate
4,231,726 A *  11/1980  Cobb ................. F04C 2/084
                                                     418/206.5

(Continued)

FOREIGN PATENT DOCUMENTS

FR           1343908 A       11/1963

OTHER PUBLICATIONS

International Search Report dated Feb. 25, 2021 issued in connection with PCT/EP2020/085712.
(Continued)

Primary Examiner — Theresa Trieu
(74) Attorney, Agent, or Firm — Akerman LLP

(57) ABSTRACT

Improved bushing assembly (10) for supporting the shafts of the intermeshed rotors of a positive displacement rotary pump avoiding jamming, said bushing assembly (10) comprising on a lateral surface (13) thereof at least one compensation tank (15; 16) facing a suction side of the pump and at least one bleed channel (14) which connects said compensation tank (15; 16) to the discharge side. [FIG. 7]

14 Claims, 9 Drawing Sheets

(52) U.S. Cl.
CPC ...... *F04C 15/0026* (2013.01); *F04C 2240/30* (2013.01); *F04C 2240/56* (2013.01)

(58) Field of Classification Search
CPC .............. F04C 2240/30; F04C 2240/50; F04C 2240/54; F04C 2240/56; F04C 2240/60
See application file for complete search history.

(56) References Cited

U.S. PATENT DOCUMENTS

| | | | | |
|---|---|---|---|---|
| 4,355,964 | A | * 10/1982 | Rodibaugh | ......... F04C 15/0042 418/206.1 |
| 2014/0308150 | A1 | * 10/2014 | Furrer | ..................... F04C 2/084 418/180 |

OTHER PUBLICATIONS

Written Opinion of the International Searching Authority dated Feb. 25, 2021 issued in connection with PCT/EP2020/085712.
International Preliminary Report on Patentability issued Mar. 22, 2022 in connection with PCT/EP2020/085712.

\* cited by examiner

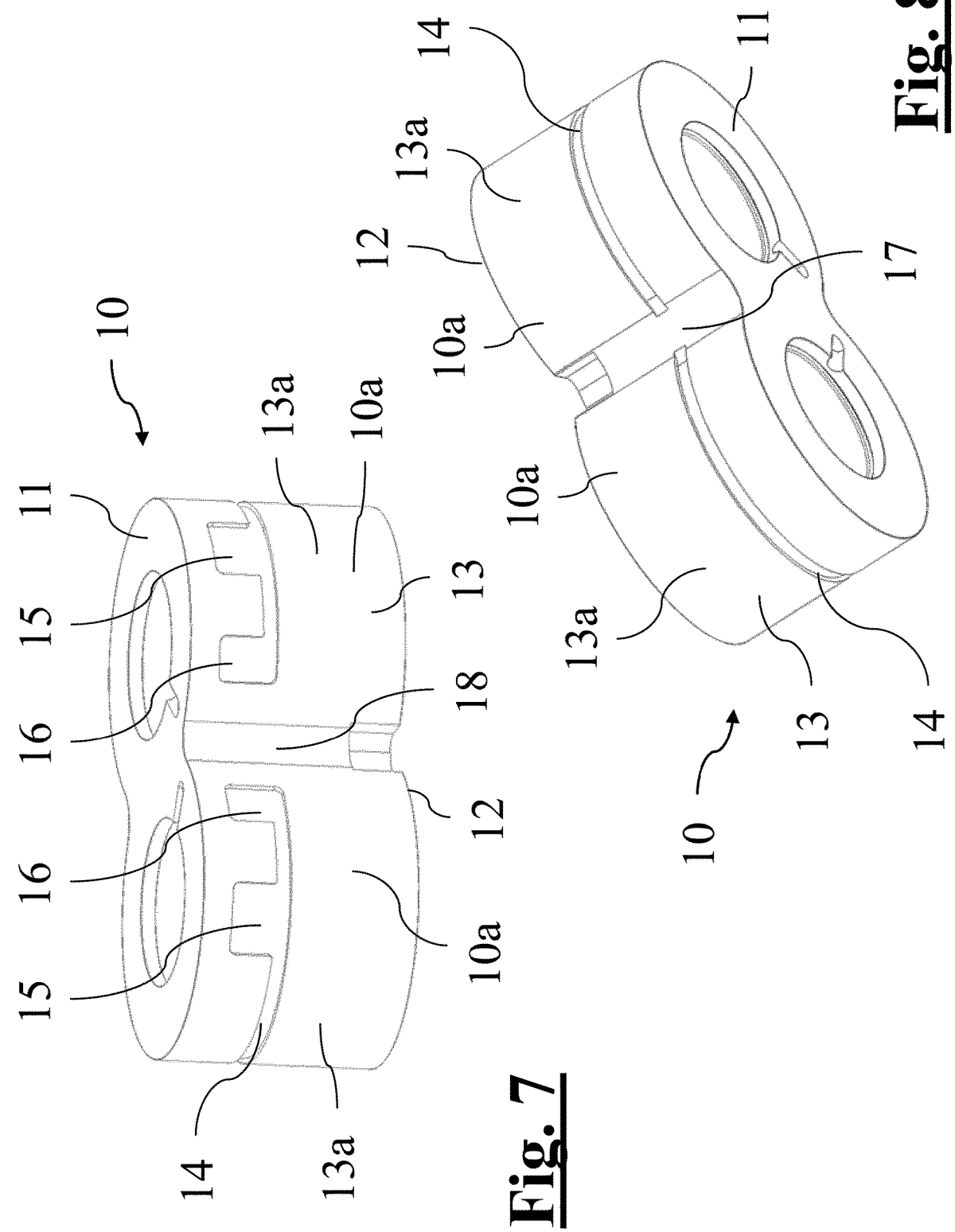

BUSHING ASSEMBLY AND POSITIVE DISPLACEMENT ROTARY PUMP COMPRISING SAID BUSHING ASSEMBLY

CROSS-REFERENCE TO RELATED APPLICATIONS

This application is a national phase of PCT/EP2020/085712, filed Dec. 11, 2020, and claims priority to Italian Patent Application No. 102019000023832, filed Dec. 12, 2019, the entire contents of both of which are hereby incorporated by reference.

FIELD OF APPLICATION

The present invention relates to a bushing assembly and to a corresponding positive displacement rotary pump, preferably a gear pump or lobe pump, comprising said bushing assembly.

The positive displacement rotary pumps may find useful application in various technological fields. In particular, the pump of the invention appears particularly indicated for high-pressure applications in which it is necessary to vary the rotation speed over time.

PRIOR ART

As mentioned above, the present invention finds useful application in a technological field that concerns gear or lobe positive displacement rotary pumps. Pumps of this type generally comprise two rotors, one of which, called driving rotor, is connected to a drive shaft and rotates the other one, called driven rotor.

The two rotors are borne by respective shafts supported by bushing assemblies, generally constituted by a bushing ring and by the actual bushings. The bushing assemblies are coupled in an internal cavity of a casing or pump body and are axially floating therewithin to allow packing the components due to the pressures acting on the opposite plane faces of the assemblies themselves.

The bushing rings currently used may have pockets on the plane faces facing towards the rotors or seats for the gaskets on the plane faces facing towards the closure flanges of the casing. These pockets or seats are useful to facilitate the discharge of the oil that lubricates the bushings and—as above mentioned—to compensate for the axial thrusts due to the fluid under pressure, i.e. to maintain the surfaces of rotors and bushings in direct contact, except for an oil film. Other types of pockets allow the fluid encapsulated between the gear teeth to recirculate in the discharge area, thus reducing pulsations and noise.

Pockets 100 of various shapes and functions are visible in the enclosed FIG. 2, which represents a bushing ring semi-element 10a according to the prior art, and in the enclosed FIG. 3, which instead represents a monolithic bushing ring 10 according to the prior art.

Up to date, the design of the bushing rings has always been directed on the one hand to obtain their axial balancing, and on the other hand to limit the misalignment of the rings themselves with respect to the axis of the rotors, trying to control the center of pressure acting on their plane faces.

On the other hand, no intervention has ever been made on the cylindrical surfaces of the rings, to avoid friction and wear phenomena due to the distribution of the load that weighs on the rotors and discharges on the rings themselves, which, as mentioned, are free to slide within the holes of the pump casing.

The construction solutions adopted so far, although substantially suitable for the purpose, nevertheless have a significant disadvantage in the case of pumps subjected to heavy applications.

In fact, in these cases there occurs an abrasion of the surface of the body holes onto which the force of the bushing rings is discharged and, correspondingly, on the bushing rings themselves. The micro-sliding between the two contact surfaces creates a roughness deterioration of the pieces, which triggers a phenomenon of local heating in the area where the specific load is greater. The material then plasticizes locally and becomes less smooth: this entails a jamming of the bushing rings during transients, with a corresponding degradation of the pump performance.

The above phenomenon is illustrated and analyzed with the aid of FIGS. 4-6.

FIG. 4 schematically shows an example of a known type of gear pump. The pump appears longitudinally sectioned according to a plane orthogonal to the one passing through the axes of the two rotors, so that in a lower part of the section there is the suction side S and in the upper one there is the discharge side D. The driving rotor 2, the drive shaft 5 and the two bushing assemblies 10, in addition to the wall on the suction side S of the pump casing 3, are shown. A distributed load F, due to the overpressure that develops during the pump operation, acts from the discharge side D both on the bearing rings 10 and on the rotor 2. The figure highlights a micro-sliding area Z1 of the bushing rings 10 and the abrasion area Z2 where the jamming occurs.

FIGS. 5 and 5a propose a static analysis carried out by the applicant, which justifies the phenomenon described above. In FIG. 5, the structure constituted by bushing rings 10 and rotor 2 is modeled with four carriage constraints a, b, c, d. FIG. 5a shows graphs indicative of the load F, the moment T and the corresponding deformation D of the structure. As visible, in points b and c there is both the maximum constraint reaction and the maximum moment, which are reduced in points a and d, respectively. Therefore, by linearizing the reaction along the entire bushing ring, a trapezoidal distribution Sj is obtained. The set-up condition is therefore not optimal and leads to the above problems.

A further analysis of the system is introduced in FIG. 6, which shows the lines of force—calculated by a modeling software—that are generated within a two-dimensional model of the bushing ring-rotor assembly. As visible, the maximum stress concentration occurs in the inner edge of the bushing ring, at the aforementioned abrasion zone Z2; this concentration rapidly decreases when moving towards the external edge.

Document U.S. Pat. No. 4,087,216 discloses a rotary fluid pump according to the prior art. The pump employs needle bearings and does not use axially floating bushings.

Document FR 1 343 908 A discloses a further rotary fluid pump according to the prior art.

In view of the above, the technical problem underlying the present invention is to conceive a bushing assembly and a corresponding positive displacement rotary pump which at least partially solve the above defect of the prior art complained of, and which consequently has improved performance and useful life and lower response times in transients.

SUMMARY OF THE INVENTION

The solution idea underlying the present invention consists in creating pressurized tanks positioned below the part of the bushing assemblies which, while in use, is in direct contact with the pump casing, i.e. the one at the internal edge on the suction side, so as to reduce the specific pressure in the greater stress area.

In light of this solution idea, the previously identified technical problem is solved by a positive displacement rotary pump comprising: a casing provided with an inner cavity with a discharge port opening on a discharge side and a suction port opening on an opposite suction side; a pair of shafts which bear, in their intermediate portion, as many intermeshing rotors rotating within the inner cavity for pumping a fluid from the discharge port to the suction port; two bushing assemblies arranged at the opposite ends of the rotors for supporting the shafts; said bushing assemblies comprising an inner face facing the rotors; an opposite external face; and a lateral surface that connects the two inner and external faces, the lateral surfaces coupling within the inner cavity; wherein the bushing assemblies comprise, on their lateral surface, at least one compensation tank, facing the suction side of the inner cavity in a closer position to the inner face than to the external one; and at least one bleed channel that connects said compensation tank to a portion of the lateral surface facing the discharge side.

The technical problem is also solved by a bushing assembly of the above identified type in the context of the entire positive displacement rotary pump.

The bushing assemblies according to the invention may comprise a bushing ring, monolithic or in two pieces; in this case the bleed channel and the at least one compensation tank are made on the bushing ring, which is arranged to bear two inner bushings. On the other hand, it is not excluded that the bushing assembly may be made as a single element or as two juxtaposed elements, without there being a bushing ring distinct from the bushing it supports.

Thanks to the above described structure, said compensation tank is filled, while in use, with fluid under pressure coming from the discharge pump. A straightening torque on the respective bushing assembly is thus defined, which helps to discharge the maximum stress area that tends to abrade in the pumps according to the prior art.

In other words, the structure according to the invention aims at bleeding the discharge fluid and bringing it into the aforementioned compensation tanks to facilitate the support of the respective bushing assembly.

In a per se known manner, said bushing assemblies are shaped as two sleeve-shaped semigroups coupled to each other, said semigroups being made in one piece or separated from each other.

The lateral surfaces thus comprise two cylindrical portions, connected or anyway juxtaposed in two coupling areas of the semigroups, on the discharge side and on the suction side, respectively.

The bleed channel preferably connects the coupling area on the discharge side with the at least one compensation tank; it preferably interrupts before reaching the opposite coupling area on the suction side.

Preferably, the bleed channel takes the form of an external circumferential groove, of limited depth, made on at least one—preferably on both—of the cylindrical portions of the lateral surface.

In a preferred embodiment, the compensation tank takes the form of a widening in the axial direction, for instance with a substantially parallelepiped shape, of the circumferential groove that defines the bleed channel.

Preferably, the compensation tank extends axially towards the inner face with respect to the bleed channel.

Preferably, the compensation tank and the bleed channel have the same depth.

In a preferred embodiment, said compensation tanks are at least two for each semigroup of each bushing assembly; they may be connected by the bleed channel itself. For instance, the compensation tanks may comprise at least one intermediate compensation tank, which intercepts the extension of the bleed channel, and at least one terminal compensation tank, whereat the bleed channel ends.

The features and advantages of the pump according to the invention will become apparent from the following description of an embodiment example given by way of non-limiting example, with reference to the enclosed drawings.

BRIEF DESCRIPTION OF THE DRAWINGS

The enclosed FIGS. 1-12 show the following:

FIG. 1 shows a perspective view with exploded parts of a generic positive displacement rotary pump, in particular a gear pump, on which the main aspects of the present invention are not detailed;

FIG. 2, as previously discussed, shows a perspective view of an element of a bushing assembly according to the prior art;

FIG. 3, as previously discussed, shows a perspective view of another bushing assembly according to the prior art;

FIG. 4, as previously discussed, shows a first schematic representation of the distribution of forces within a positive displacement rotary pump of the prior art;

FIG. 5, as previously discussed, shows a second schematic representation of the distribution of forces within a positive displacement rotary pump of the prior art;

FIG. 5a, as previously discussed, shows the graphs of the load F, the moment T and the corresponding deformation D of the structure constituted by rotor and bushing assemblies in the pump represented in FIG. 5;

FIG. 6, as previously discussed, represents the lines of force that are generated within a two-dimensional model of the bushing assemblies—rotor group in the pump represented in FIG. 5;

FIG. 7 shows a perspective view of a bushing assembly of a positive displacement rotary pump according to the present invention;

FIG. 8 shows a perspective view, according to a different angle, of the bushing assembly of FIG. 7;

FIG. 9 still shows the perspective view of FIG. 7 highlighting an area of greater concentration of loads;

FIG. 10 shows a lateral view of the bushing assembly of FIG. 7;

FIG. 11 shows a schematic representation of the distribution of forces within a positive displacement rotary pump according to the present invention;

FIG. 11a shows the graphs of the load F, the moment T and the corresponding deformation D of the structure constituted by rotor and bushing assemblies in the pump represented in FIG. 11;

FIG. 12 represents the lines of force that are generated within a two-dimensional model of the bushing assemblies—rotor group in the pump represented in FIG. 11.

DETAILED DESCRIPTION

Figure 1:
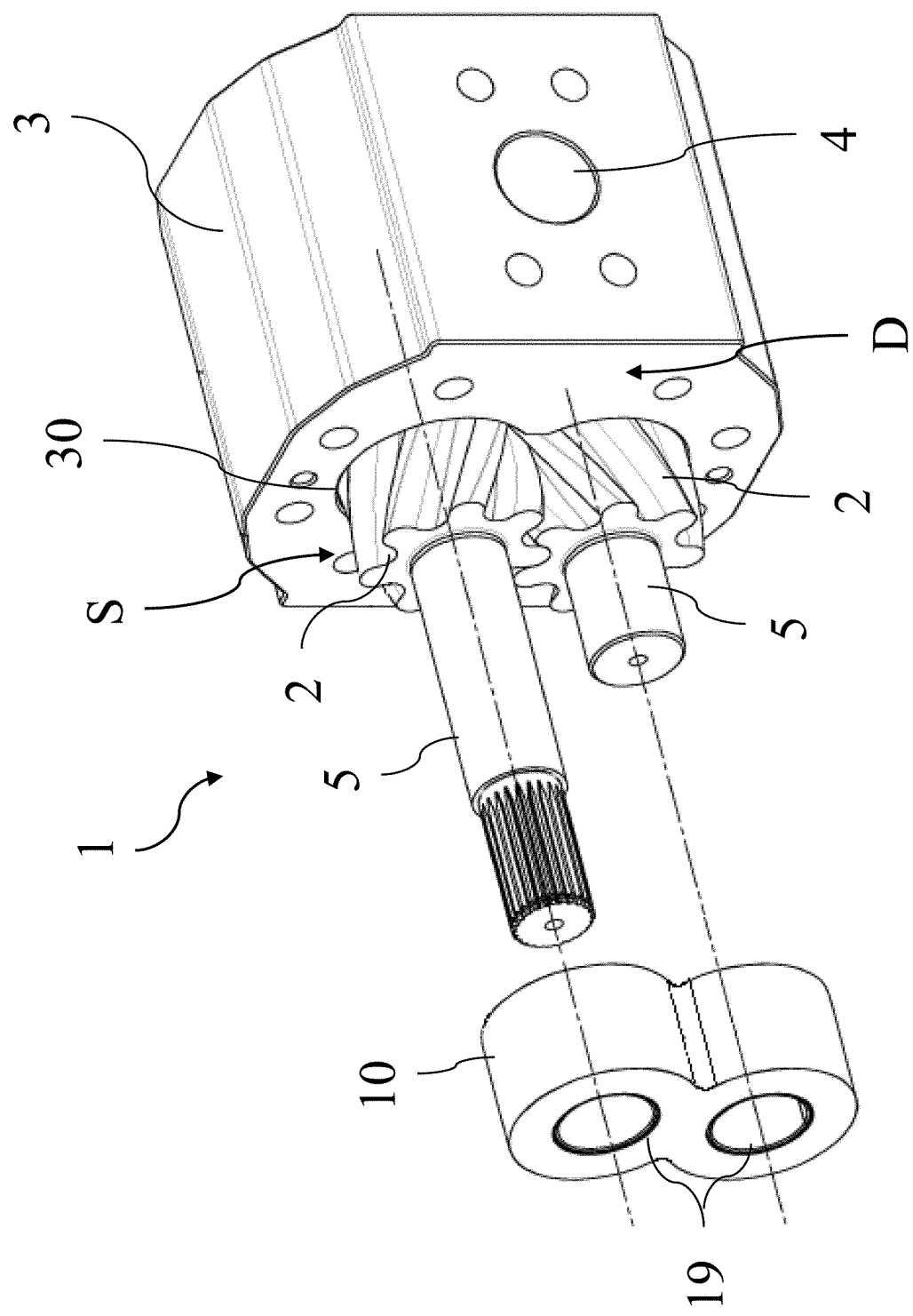
Figure 3:
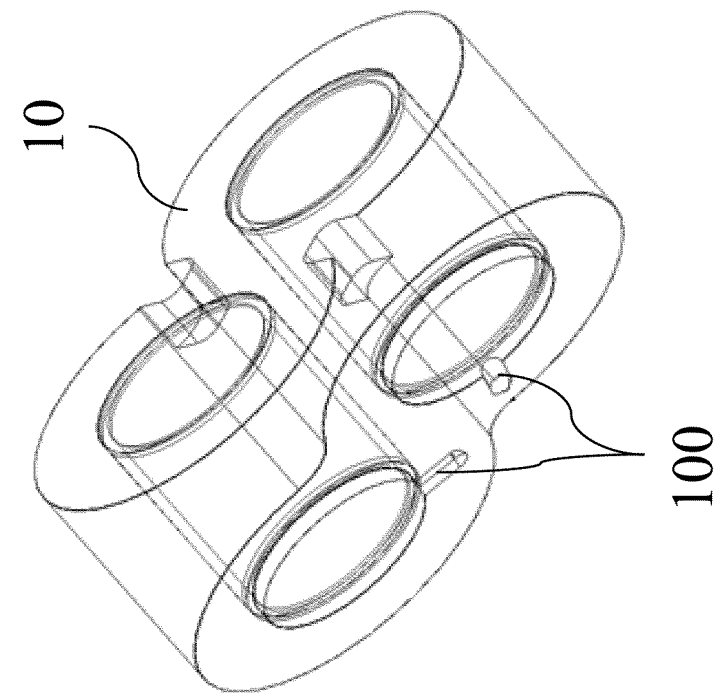

With reference to FIG. 1, reference number 1 globally and schematically indicates a positive displacement rotary pump made according to the present invention with gear cog wheels.

The positive displacement rotary pump 1 comprises a pair of rotors 2, in particular of toothed wheels, supported by respective shafts 5 and enclosed in a casing 3. A first driving toothed wheel is connected to a drive shaft with a protruding end with respect to the casing 3, and a second driven toothed wheel is rotated by the driving wheel. In a preferred embodiment of the present invention, the two rotors 2 are gear wheels with helical teeth.

The casing 3 is closed fore and aft by two covers or flanges that are not represented because of the known type. On one side the casing has a suction port for the fluid, which is not represented in the enclosed figure, and on the other one a discharge port 4. Furthermore, the casing defines an internal inner cavity 30, within which the rotors 2 and the bushing assemblies 10 are introduced, which has a suction side S at the suction mouth and an opposed discharge side at the discharge mouth D.

Figure 2:
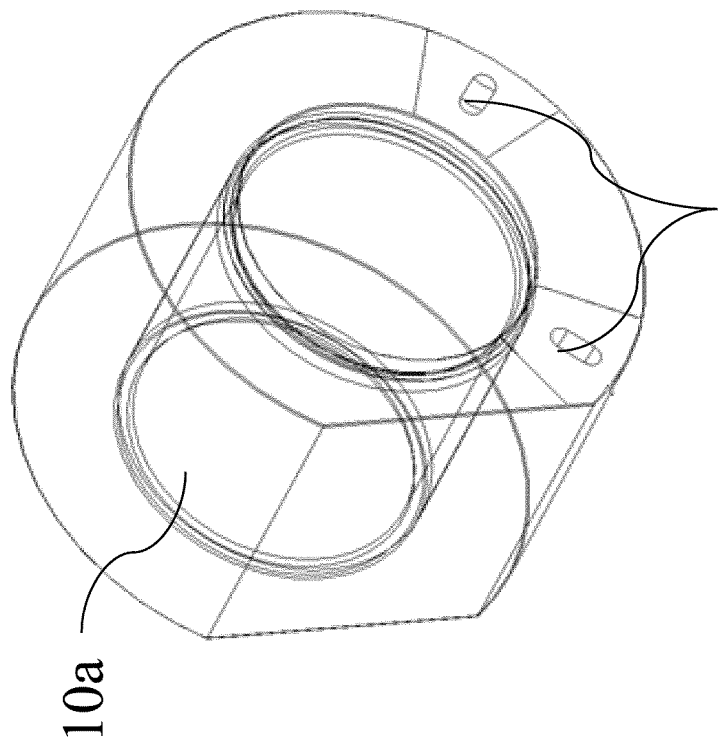
Figure 4:
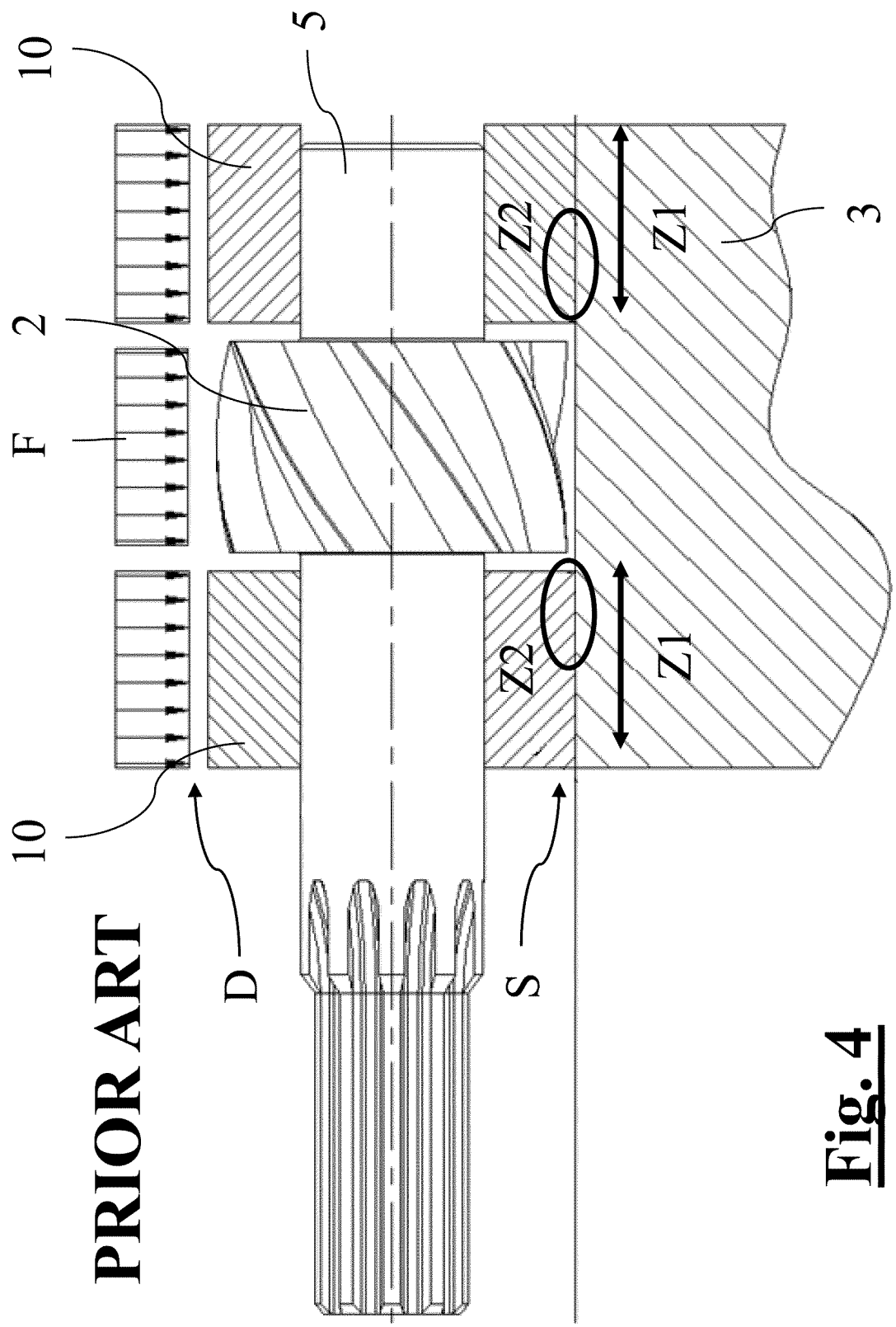

Within the casing 3, the shafts 5 of the rotors 2 are supported at the two ends by two bushing assemblies 10, only one of which is represented in FIG. 1. Each of the bushing assemblies 10 may be made in one piece, as represented in the figure, or in two separated and juxtaposed semigroups 10a, analogously to what is provided for in the prior art of FIG. 2. Preferably, each of the bushing assemblies 10 comprises a bushing ring and two inner bushings 19 mounted thereon.

It should be noted that FIG. 1 does not illustrate the peculiarities of the bushing assemblies 10 according to the present invention, which are instead visible in the subsequent FIGS. 7-10.

As it may be observed, each bushing assembly 10 has an inner face 11, arranged to contact the rotors 2, except for an oil film, and an external face 12 which is opposed to the first one and faces the side of the covers or flanges of the casing 3. The two faces are connected by a lateral surface 13 constituted by the two cylindrical surfaces 13a, connected to each other in a coupling area 17 on the discharge side D and in a coupling area 18 on the suction side S.

On the bushing assemblies 10 two bleed channels 14, made as circumferential grooves on the respective cylindrical surfaces 13a are provided. The bleed channels 14 extend from the coupling area 17 on the discharge side D until they reach two compensation tanks 15, 16 on the suction side S. The compensation tanks 15, 16 are advantageously arranged in a maximum stress H area of the bushing assembly 10, which is located on the suction side S in a close area with respect to the inner face 11.

Figure 10:
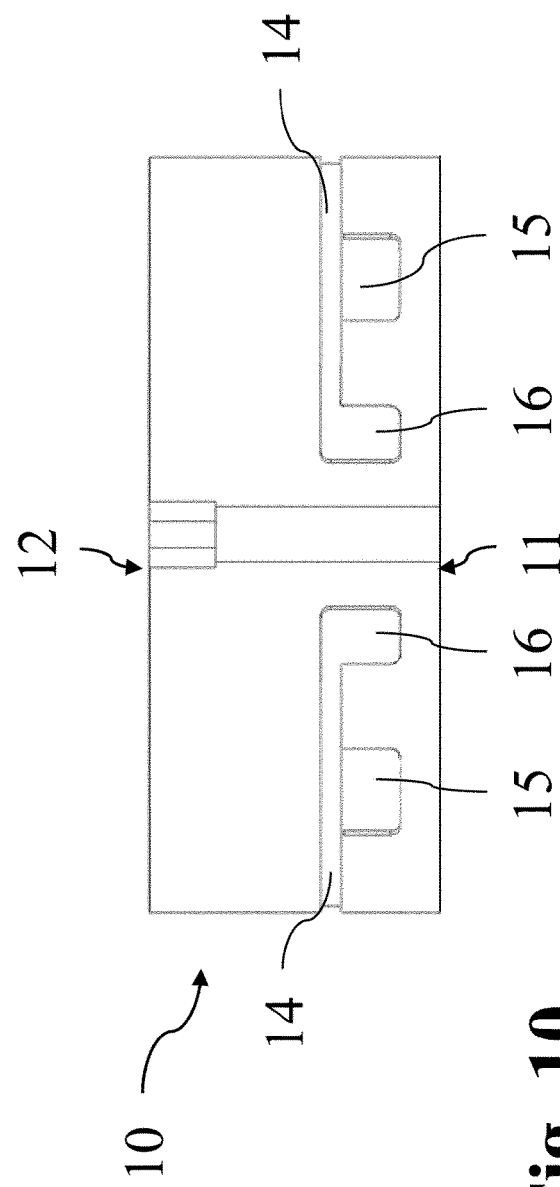

As clearly visible in FIG. 10, an intermediate compensation tank 15 intercepting the bleed channel 14 and a subsequent terminal compensation tank 16, at which the bleed channel 14 interrupts, are provided.

The compensation tanks 15, 16 may be of a different shape; in the preferred embodiment herein illustrated, they are substantially parallelepiped, they have a depth that is substantially equal to that of the bleed channel 14 and extend towards the inner face 11 of the bushing assembly 10.

Starting from said preferred configuration, the position and conformation of the bleed channel 14 and of the compensation tanks 15, 16 may be identified by means of the following measures:

Axial width of the bleed channel 14;
Axial width of each compensation tank 15, 16 (preferably, but not necessarily, the same);
Distance of the bleed channel 14 from the inner face 11 of the bushing assembly 10;
Circumferential length of each compensation tank 15, 16 (preferably, but not necessarily, the terminal tank 16 has a length that is less than the intermediate tank 15);
Circumferential distance between the two subsequent compensation tanks 15, 16 (preferably, but not necessarily, approximately equal to the circumferential length of the intermediate tank 15);
Position of the tanks with respect to the axis of the bearing center.

The above measures may be identified through numerical modeling to obtain, depending on the size and intended use of the pump, the maximum redistribution of the load, i.e. the minimum surface pressure in the above area of maximum stress H.

The above described conformation of the bushing assemblies 10 favours, during the use of the pump, the bleeding of the fluid under pressure within the compensation tanks 15, 16. In this way, a realignment force Fr is obtained at the area of maximum stress of the bushing assembly 10, which generates a corresponding realignment moment Tr, helping to realign the bushing assembly 10 with the pump axis and to rebalance the loads acting thereon, thus eliminating or at least reducing the phenomenon of local abrasion and that of the consequent jamming in the operational transients.

Figures 5, 5A:
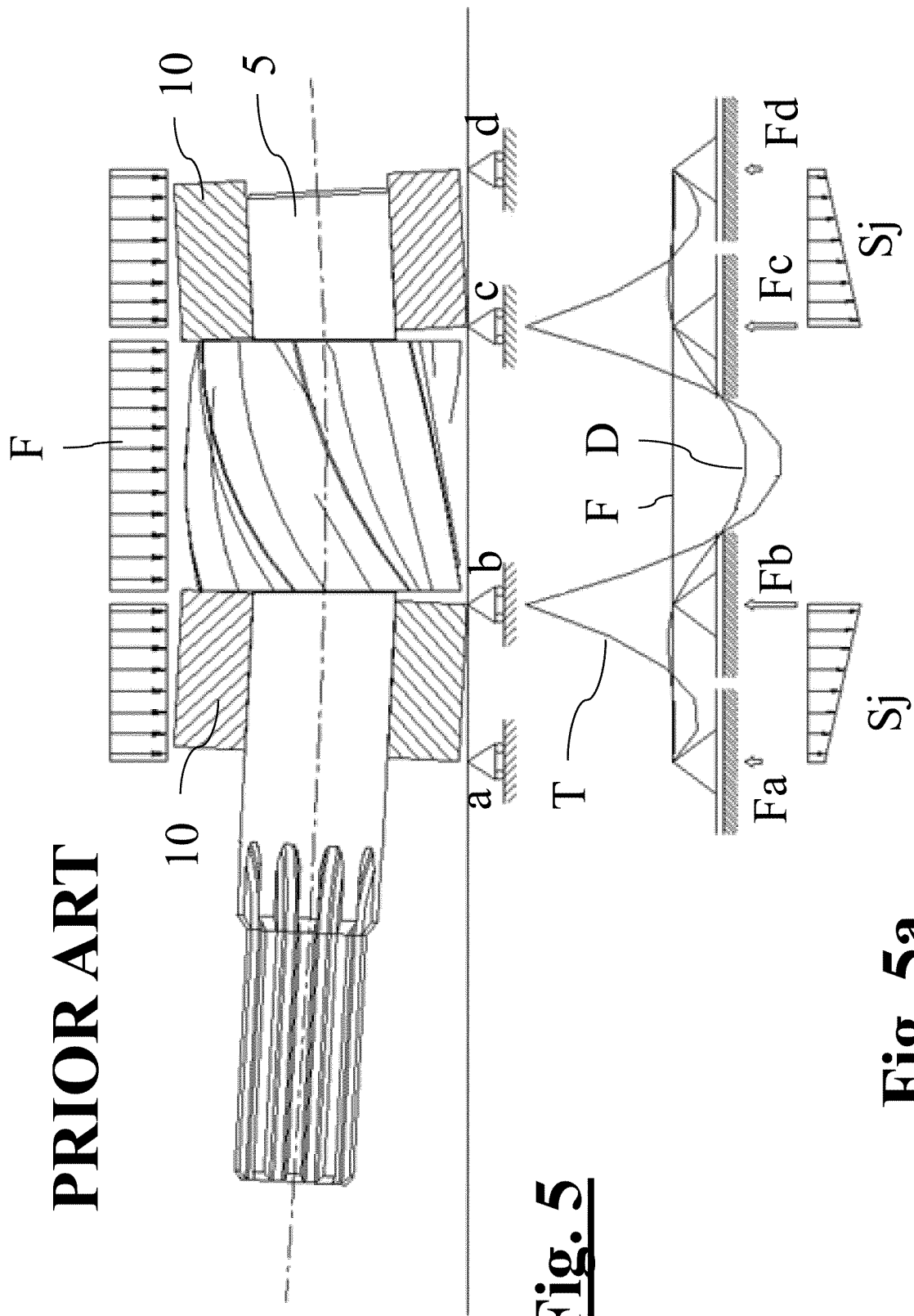
Figures 11, 11A:
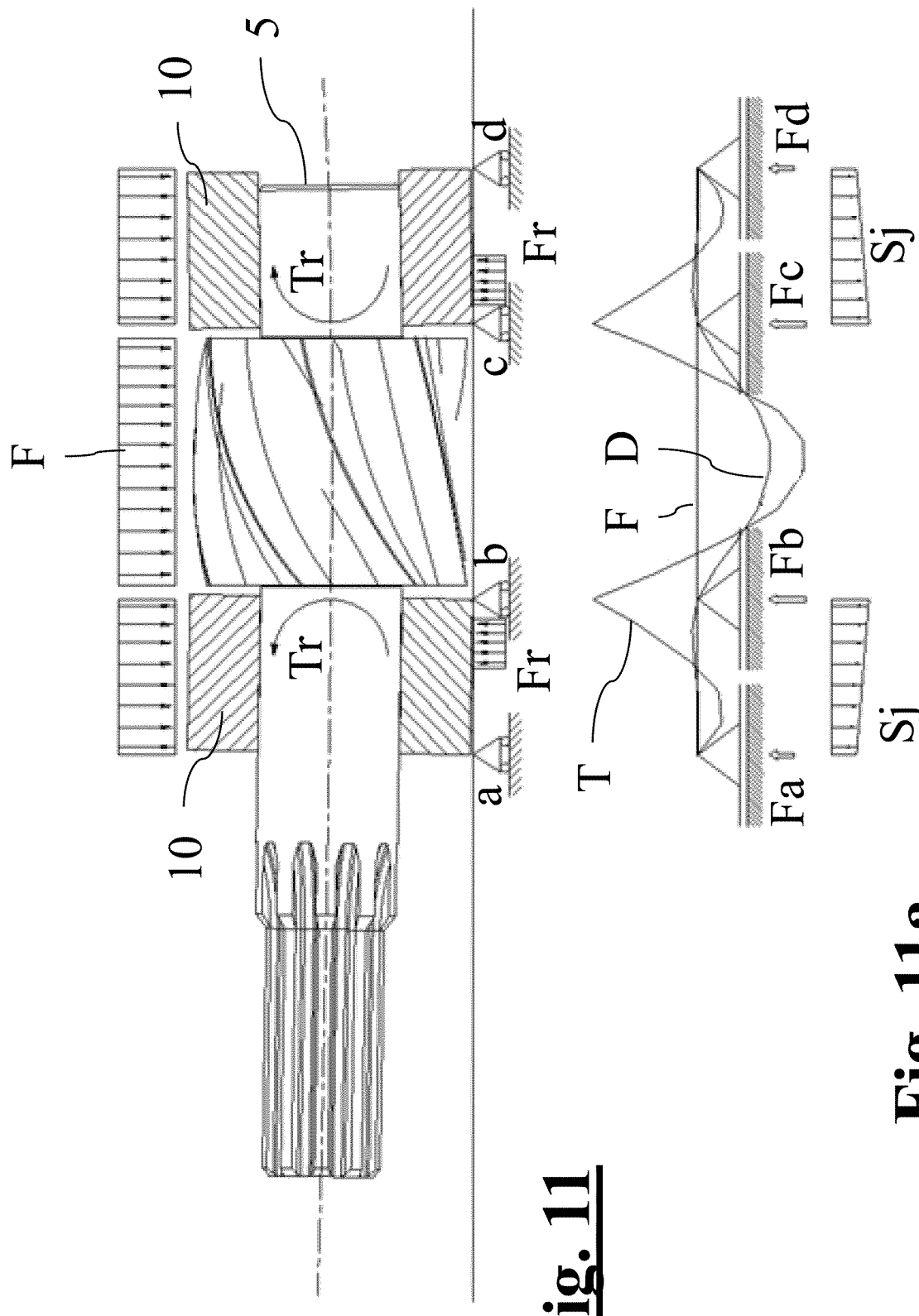

FIG. 11 introduces the realignment force Fr and the realignment moment Tr determined by the compensation tanks 15, 16 in the diagram of FIG. 5. FIG. 11a shows graphs indicative of the load F, the moment T and the corresponding deformation D of the structure. There is a significant redistribution of the stresses along the bushing assembly 10, and a decrease in the constraint reactions at the edge with the inner face 11.

Figure 6:
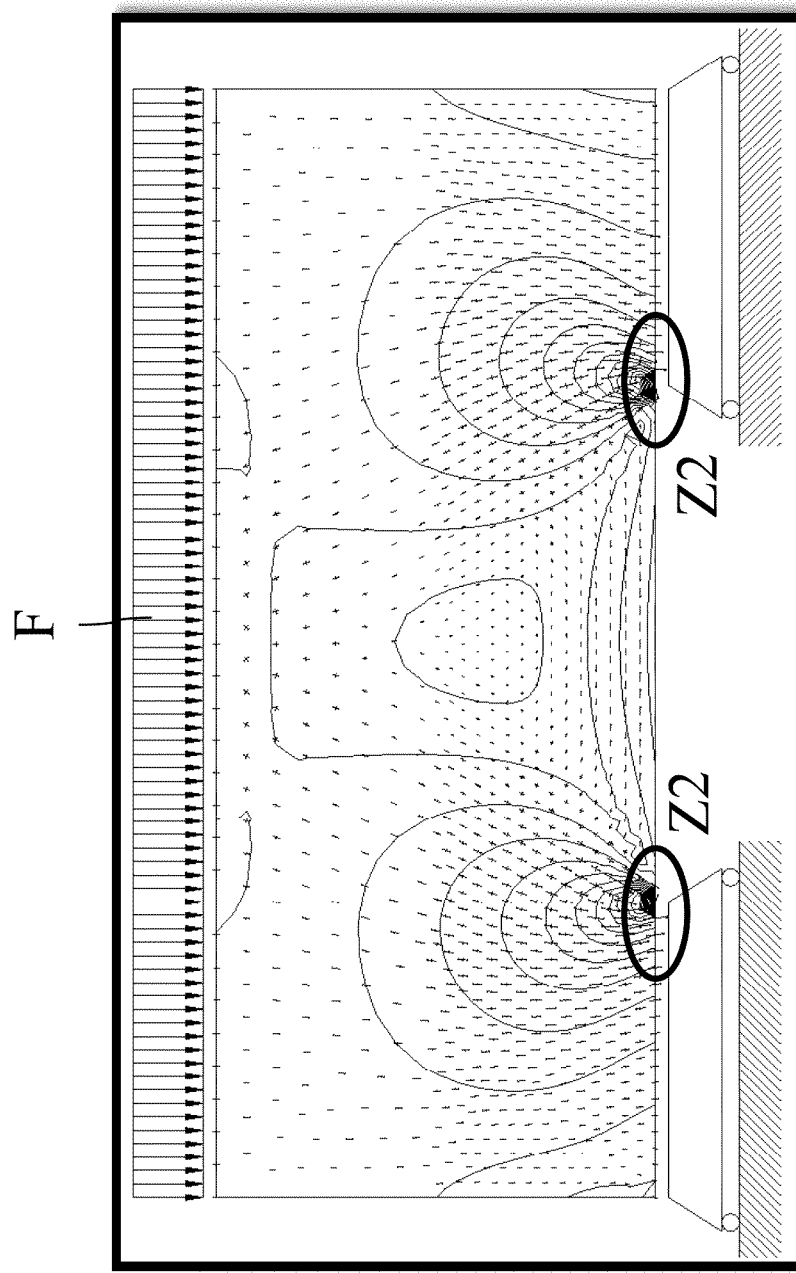
Figure 9:
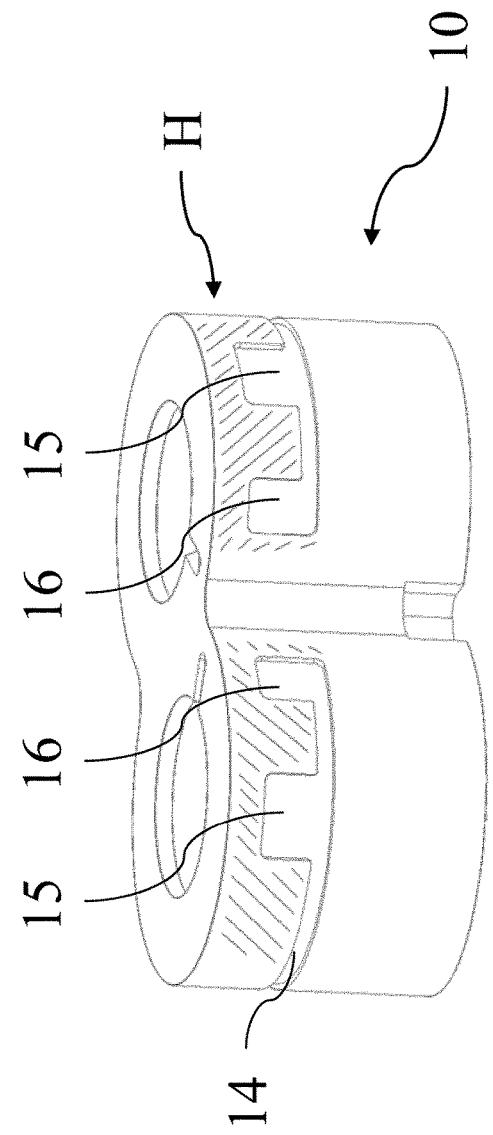
Figure 12:
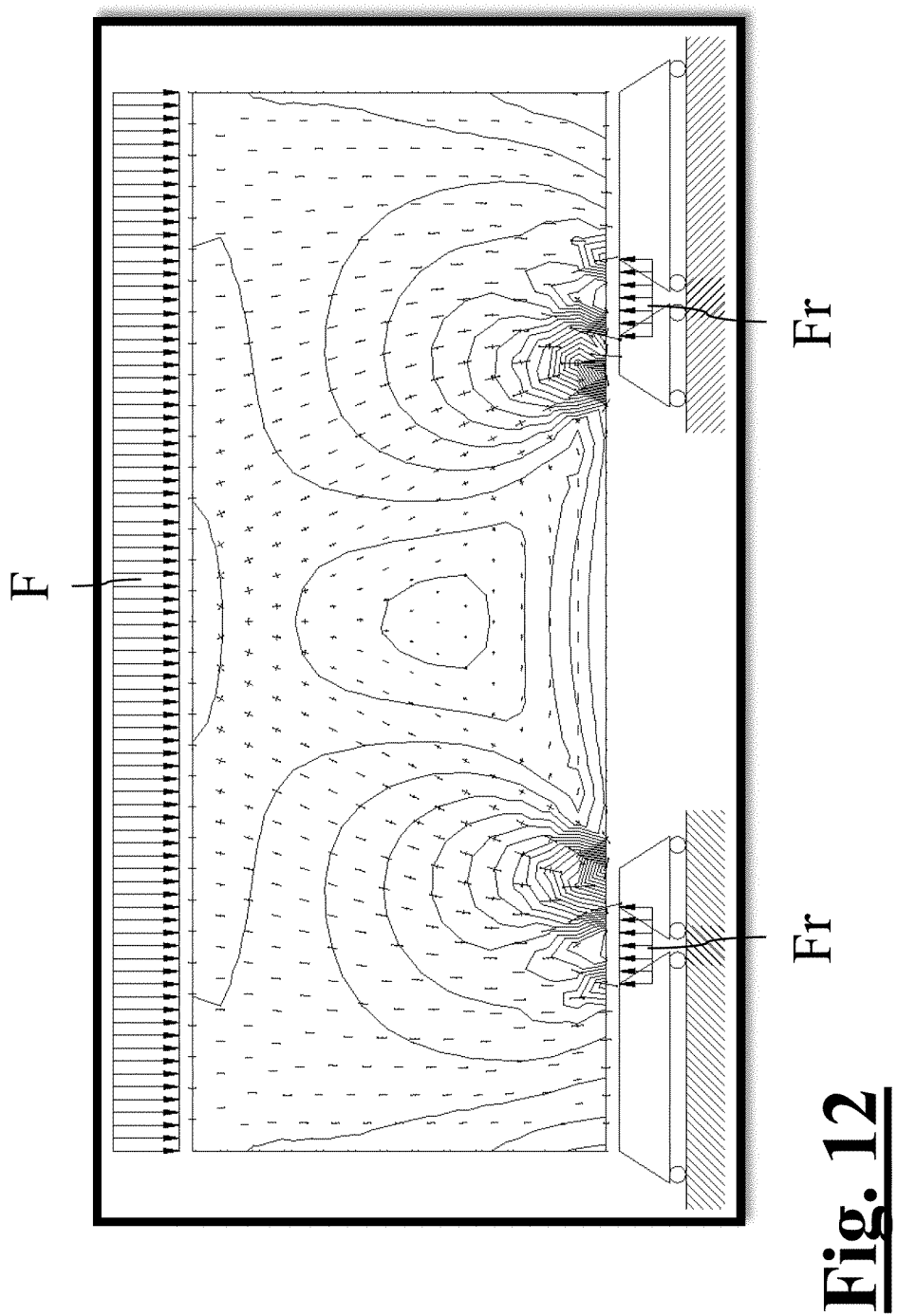

FIG. 12 shows the lines of force—calculated by a modeling software—that are generated within a two-dimensional model of the bushing rings—rotor group. By comparing with the model of the prior art in FIG. 6, it can be noted that, although the average pressure on the remaining surface portion remains constant, the effort is better distributed by widening the portion of the surface that most cooperates in supporting the bushing assembly 10.

By further calculations the maximum effort can be reduced by about 40% for the reason explained above.

Obviously, a skilled person can make several changes and variants to the above described invention, in order to meet contingent and specific needs, all of them by the way contained in the scope of protection of the invention as defined by the following claims.

What is claimed is:

1. A bushing assembly for a positive displacement rotary pump, arranged to be inserted into an internal cavity of a positive displacement rotary pump, axially floating therewithin, and to support the ends of a pair of shafts bearing the rotors of said positive displacement rotary pump;
   said bushing assembly comprising an inner face, facing, while in use, the rotors;
   an opposed outer face;
   wherein, while in use, the bushing assembly is free to axially slide within the internal cavity due to fluid pressures acting on the inner and external faces;
   the bushing assembly further comprising: a lateral surface which connects the two inner and outer faces, said lateral surface being arranged to be coupled within the internal cavity with a first portion facing a suction side and a second portion facing a discharge side;
   at least one compensation tank on the first portion of said lateral surface, in a position closer to the inner face than to the outer face;
   and at least one bleed channel which connects said at least one compensation tank to the second portion of the lateral surface;
   wherein the at least one compensation tank is laterally closed on both sides of the inner face and the outer face of the bushing assembly, wherein the at least one compensation tank does not open on the inner face nor on the external face of the bushing assembly.

2. The bushing assembly according to claim 1, shaped as two sleeve-shaped semigroups coupled to each other, said semigroups being made in one piece or separated from each other.

3. The bushing assembly according to claim 2, wherein said lateral surfaces comprise two cylindrical portions connected or juxtaposed in two coupling areas of the semigroups, on the discharge side and on the suction side respectively.

4. The bushing assembly according to claim 3, wherein said bleed channel connects, while in use, the coupling area on the discharge side with the at least one compensation tank; and wherein said bleed channel does not reach the coupling area on the suction side.

5. The bushing assembly according to claim 3, wherein said bleed channel takes the form of an external circumferential groove formed on at least one of the cylindrical portions of the lateral surface.

6. The bushing assembly according to claim 5, wherein said at least one compensation tank takes the form of a widening in the axial direction of the circumferential groove which defines the bleed channel.

7. The bushing assembly according to claim 6, wherein said at least one compensation tank extends axially towards the inner face with respect to the bleed channel.

8. The bushing assembly according to claim 6, wherein said at least one compensation tank has a substantially parallelepiped conformation.

9. The bushing assembly according to claim 6, wherein said at least one compensation tank and said bleed channel have the same depth.

10. The bushing assembly according to claim 6, wherein said at least one compensation tank comprises at least two compensation tanks for each semigroup.

11. The bushing assembly according to claim 10, wherein the two compensation tanks of each semigroup are connected by the same bleed channel.

12. The bushing assembly according to claim 11, wherein the at least one compensation tank is at least one intermediate compensation tank which intercepts the extension of the bleed channel, and at least one terminal compensation tank, whereat the bleed channel ends.

13. The bushing assembly according to claim 1, comprising a bushing ring, monolithic or in two pieces, which is associated with two inner bushings, the bleed channel and at least one compensation tank being made on the bushing ring.

14. A positive displacement rotary pump comprising: a casing provided with an internal cavity with a discharge port opening on a discharge side and a suction port opening on an opposite suction side; a pair of shafts which bear, in their intermediate portion, as many intermeshing rotors rotating within the internal cavity for pumping a fluid from the discharge port to the suction port; two bushing assemblies according to claim 1, said bushing assemblies being arranged at the opposite ends of the rotors for supporting the shafts with the inner face facing the rotors and the lateral side coupled within the internal cavity; said compensation tank facing the suction side of the internal cavity; and said at least one bleed channel connecting said compensation tank to a portion of the lateral surface facing the discharge side, wherein, while in use, said compensation tank is filled with fluid under pressure defining a straightening torque on the respective bushing assembly.

\* \* \* \* \*